United States Patent
Pirbhai et al.

(10) Patent No.: US 7,489,628 B2
(45) Date of Patent: Feb. 10, 2009

(54) COMMUNICATION TRAFFIC MANAGEMENT MONITORING SYSTEMS AND METHODS

(75) Inventors: Shafiq Pirbhai, Kanata (CA); Neil Darren Hart, Chelsea (CA); Shawn McAllister, Manotick (CA)

(73) Assignee: Alcatel Lucent, Paris (FR)

( * ) Notice: Subject to any disclaimer, the term of this patent is extended or adjusted under 35 U.S.C. 154(b) by 547 days.

(21) Appl. No.: 11/041,561

(22) Filed: Jan. 24, 2005

(65) Prior Publication Data

US 2006/0164979 A1 Jul. 27, 2006

(51) Int. Cl.
*G01R 31/08* (2006.01)

(52) U.S. Cl. .......................... 370/229; 370/235

(58) Field of Classification Search ................. 370/229, 370/230, 230.1, 235, 278, 282, 395.21, 351, 370/352, 353, 354, 356
See application file for complete search history.

(56) References Cited

U.S. PATENT DOCUMENTS

2002/0057650 A1* 5/2002 Chuah et al. ................ 370/232

2004/0071086 A1* 4/2004 Haumont et al. ............ 370/230

FOREIGN PATENT DOCUMENTS

EP 1249972 10/2002

* cited by examiner

*Primary Examiner*—Chirag G Shah
*Assistant Examiner*—Nima Mahmoudzadeh

(57) ABSTRACT

Systems and methods of monitoring a communication traffic transfer rate control mechanism are provided. The traffic transfer rate control mechanism may control a rate of transfer of communication traffic from a first communication traffic management device to a second communication traffic management device, for example. A communication traffic storage history, which is indicative of an effect of the transfer rate control mechanism, is compiled by determining amounts of communication traffic stored in at least one communication traffic queue of at least one of the communication traffic management devices, at each of a number of monitor times. An indication of the determined amounts of communication traffic is provided, and may be analyzed to determine whether the transfer rate control mechanism actually achieves a desired effect. The transfer rate control mechanism or control parameters thereof may then be adjusted if the desired effect is not currently being achieved.

16 Claims, 3 Drawing Sheets

COMMUNICATION TRAFFIC MANAGEMENT MONITORING SYSTEMS AND METHODS

FIELD OF THE INVENTION

This invention relates generally to communication traffic management and, in particular, to monitoring the effects of communication traffic management mechanisms.

BACKGROUND

When providing Asynchronous Transfer Mode (ATM) access on a communication switch or router capable of sophisticated Layer 3 communication traffic management, as is often the case in communication systems, it is generally desirable to allow outgoing customer communication traffic to be subject to communication traffic management at both Layer 3, typically Internet Protocol (IP), and Layer 2 (ATM). In other words, a service provider may wish to shape or rate limit different classes of IP traffic separately, and then shape the aggregate flow in conformance with an ATM traffic descriptor.

However, ATM traffic management is typically provided through specialized hardware that is also responsible for cell segmentation and reassembly, while IP traffic management may use the same hardware as is used for other access technologies at a switch or router. Relatively generic and costly hardware which supports various technologies such as IP may therefore be provided in multiple circuit card slots of a switch or router. Any of a variety of types of less costly medium- or protocol-specific access technology modules such as line cards are then connected to the generic hardware to provide an interface to a lower layer protocol for each circuit card slot. The same routing hardware may thus be used with different access technology modules.

In advanced communication switches or routers, communication traffic management at both Layer 3 (L3), to enable different communication traffic handling for different Differentiated Service Code Point (DSCP) codepoints for instance, and Layer 2 (L2), such as shaping in conformance with an ATM traffic descriptor, may be achieved through the use of specialized hardware that combines L3 and L2 communication traffic management in either a single communication device or a small number of devices that were designed to work together.

When budget, time-to-market, or other constraints preclude the creation of specialized hardware, it may be necessary to combine L3 and L2 communication devices which were not designed to work together. In this type of implementation, each traffic management device normally discards communication traffic as queues exceed configured thresholds or if buffer pool exhaustion, indicative of high total queue occupancy, occurs. In the above example of L3 and ATM traffic management, the ATM traffic management device would discard communication traffic as its per-VC queues fill up. These discards are not L3 class-aware, with communication traffic of any particular L3 class just as likely to be discarded as communication traffic of any other L3 class, thereby effectively defeating the L3 traffic management.

Accordingly, it may be desirable to provide a communication traffic management mechanism which allows the use of different traffic management devices to accomplish complex traffic management without using specialized hardware. Even where such a mechanism is provided, there remains a need for monitoring the effects of the traffic management mechanism. This allows a determination to be made as to whether traffic management is actually achieving desired behaviors.

SUMMARY OF THE INVENTION

Embodiments of the invention provide systems and methods of monitoring the effects of communication traffic management mechanisms. Information gathered during monitoring of Layer 3 and Layer 2 traffic management devices, for example, may be used to determine whether actions should be taken to adapt a feedback or control loop which is used to control a rate of transfer of communication traffic from the Layer 3 traffic management device to the Layer 2 traffic management device.

According to one aspect of the invention, there is provided a system for monitoring a communication traffic transfer rate control mechanism in accordance with which transfer rate control is applied to a first communication traffic management device to control a rate of transfer of communication traffic from the first communication traffic management device to a second communication traffic management device. The system includes a monitor configured to compile a communication traffic storage history by determining respective amounts of communication traffic stored in at least one communication traffic queue of at least one of the communication traffic management devices at each of a plurality of monitor times, and an output configured to provide an indication of the determined amounts of communication traffic.

Where the transfer rate control mechanism periodically performs transfer rate control operations, the monitor times may span a plurality of transfer rate control operations.

In some embodiments, the first and second communication traffic management devices employ respective communication traffic management schemes, with the first communication traffic management device being capable of transferring communication traffic, in accordance with a first communication traffic management scheme, to the second communication traffic management device for processing in accordance with a second communication traffic management scheme. For example, the first communication traffic management device may be an Internet Protocol (IP) communication traffic management device, and the second communication traffic management device may be an Asynchronous Transfer Mode (ATM) communication traffic management device.

The monitor may also be configured to determine a control parameter of the transfer rate control mechanism at each of the plurality of monitor times, in which case the output may provide an indication of the determined control parameter. The control parameter may include one or more of: a threshold based upon which the transfer rate control mechanism controls the rate of transfer of communication traffic between the communication traffic management devices, a type of transfer rate control which is currently applied by the transfer rate control mechanism, a component of the first communication traffic management device to which transfer rate control is currently applied by the transfer rate control mechanism, a component of the second communication traffic management device for which transfer rate control is currently applied by the transfer rate control mechanism, communication traffic to which transfer rate control is currently applied by the transfer rate control mechanism, a number of times that a traffic transfer control operation has been performed by the transfer rate control mechanism, a time at which transfer rate control was applied, and an amount of time which has elapsed since completion of a preceding traffic transfer control operation.

A threshold, which represents one example of a control parameter, may include a threshold associated with a communication traffic queue, and/or a threshold associated with multiple communication traffic queues.

The amounts of stored communication traffic may be determined, for example, as a queue depth or a threshold status of a queue, the threshold status indicating whether the amount of traffic stored in the queue exceeds a threshold associated with the queue.

A control parameter adjustment system may also be provided to adjust a control parameter of the transfer rate control mechanism based on monitored information. Adjustment of a control parameter may be a manual operation performed by an operator for instance, or automatic. Such control parameters as the following may be adjusted: a threshold based upon which the transfer rate control mechanism controls the rate of transfer of communication traffic between the communication traffic management devices, a threshold multiplier used to adjust a threshold based upon which the transfer rate control mechanism controls the rate of transfer of communication traffic between the communication traffic management devices, a degree to which the transfer rate control mechanism reduces or increases the rate of transfer of communication traffic between the communication traffic management devices, and a frequency at which the transfer rate control mechanism performs a transfer rate control cycle to determine whether transfer rate control is to be applied to the first communication traffic management device.

According to some embodiments, the transfer rate control mechanism is implemented using a queue threshold status detector which is configured to determine whether an amount of communication traffic currently stored in a communication traffic queue of the second communication traffic management device exceeds a threshold, and a transfer rate control module operatively coupled to the queue threshold status detector and configured to apply transfer rate control to the first communication traffic management device, based on whether the amount of communication traffic exceeds the threshold. The monitor may then be operatively coupled to and configured to poll the queue threshold status detector at each of the plurality of monitor times to thereby determine amounts of communication traffic stored in one or more queues as a threshold status of the queue(s).

A further aspect of the invention provides a method of monitoring a communication traffic transfer rate control mechanism in accordance with which transfer rate control is applied to a first communication traffic management device to control a rate of transfer of communication traffic from the first communication traffic management device to a second communication traffic management device. The method involves determining respective amounts of communication traffic stored in at least one communication traffic queue of at least one of the communication traffic management devices at each of a plurality of monitor times to thereby compile a communication traffic storage history, and providing an indication of the determined amounts of communication traffic.

According to particular embodiments of the invention, these operations may be performed in any of various manners such as those described briefly above. A monitoring method may also include additional operations, examples of which have been briefly described above.

Another aspect of the invention provides a method of monitoring a communication traffic transfer rate control mechanism which periodically performs a transfer rate control operation to control a rate of transfer of communication traffic, in accordance with a first communication traffic management scheme, for processing in accordance with a second communication traffic management scheme. The method includes determining whether an effect of the transfer rate control mechanism, in a plurality of transfer rate control operations, on amounts of communication traffic stored for processing in accordance with the second communication traffic management scheme achieves target communication traffic storage behavior, and adjusting a control parameter of the transfer rate control mechanism where the effect of the transfer rate control mechanism does not achieve the target communication traffic storage behavior.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
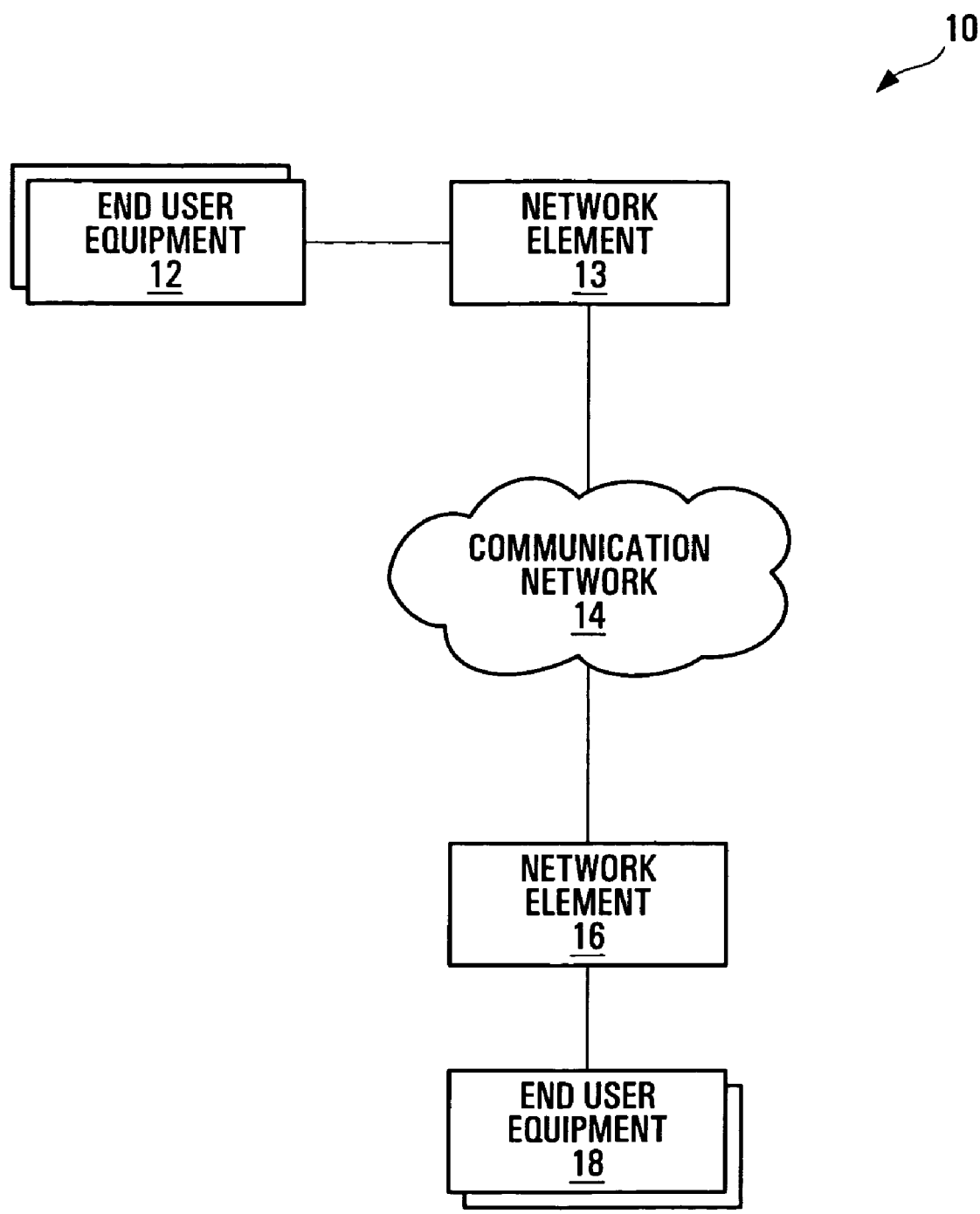
FIG. 1 is a block diagram of a communication system in which embodiments of the invention may be implemented.

FIG. 1 is a block diagram of a communication system in which embodiments of the invention may be implemented. The communication system 10 in FIG. 1 includes end user communication equipment 12, 18, network elements 13, 16, and a communication network 14. Although many installations of end user equipment 12, 18 and network elements 13, 16 may be connected to the communication network 14, only two examples of each of these components have been labelled in FIG. 1 to avoid congestion. It should therefore be appreciated that the system of FIG. 1, as well as the contents of the other drawings, are intended solely for illustrative purposes, and that the present invention is in no way limited to the particular example embodiments explicitly shown in the drawings and described herein.

The end user equipment 12, 18 represents communication equipment which is configured to generate and transmit and/or receive and terminate communication traffic. Although shown as being directly connected to the network elements 13, 16, it will be apparent that end user equipment 12, 18 may communicate with the network elements 13, 16 through other intermediate components (not shown).

Switches and routers are illustrative of the types of communication equipment represented by the network elements 13, 16. The network elements 13, 16 provide access to the communication network 14 and thus have been shown separately in FIG. 1 for illustrative purposes.

The communication network 14, in addition to the border or edge network elements 13, 16, may also include intermediate network elements which route communication traffic through the communication network 14.

Many different types of end user, intermediate, and network communication equipment, as well as the operation thereof, will be apparent to those skilled in the art. In general, communication traffic originating with end user equipment 12, 18, and possibly other sources of communication traffic, for transfer to a remote destination through the communication network 14 is received by a network element 13, 16, translated between different protocols or formats if necessary, and routed through the communication network 14. In particular example embodiments, the network elements 13, 16 exchange traffic over ATM or Synchronous Optical Network (SONET), using Packet over SONET (POS) mechanisms for instance, with the end user communication equipment 12, 18, whereas the communication network 14 is an IP network. However, as will become apparent from the following description, embodiments of the invention are not limited to any particular types of communication equipment, transfer mechanisms, or protocols.

One common type of installation for communication network equipment such as the network elements 13, 16 includes an equipment rack having multiple slots. As described above, each slot may include generic hardware for supporting communications with the communication network 14. A line card is then used in each slot to provide a medium- or protocol-specific interface. Using this kind of architecture, it tends to be easier to maintain spares for medium-specific modules in case of equipment failure, and substantially the same hardware core may be used in conjunction with various medium-specific modules.

As described above, known techniques for combined multi-layer communication traffic management involve integration of different technologies or the use of custom hardware which has been specifically designed for inter-operation. The cost associated with replacing existing generic hardware in the network elements 13, 16 to support combined communication traffic management is not generally feasible. Even for new equipment installations, cost, time, and other constraints may preclude custom hardware design.

Some multi-layer communication traffic management techniques are intended to avoid these drawbacks by providing a transfer rate control mechanism to control the transfer of communication traffic from a first communication traffic management device to a second communication traffic management device. Although such a mechanism may enable the implementation of relatively complex combined communication traffic management using diverse communication traffic management schemes, it may also be desirable to monitor the transfer rate control mechanism, and possibly to adapt or adjust the transfer rate control mechanism, so as to ensure that the transfer rate control mechanism is actually operating to produce intended results.

Figure 2:
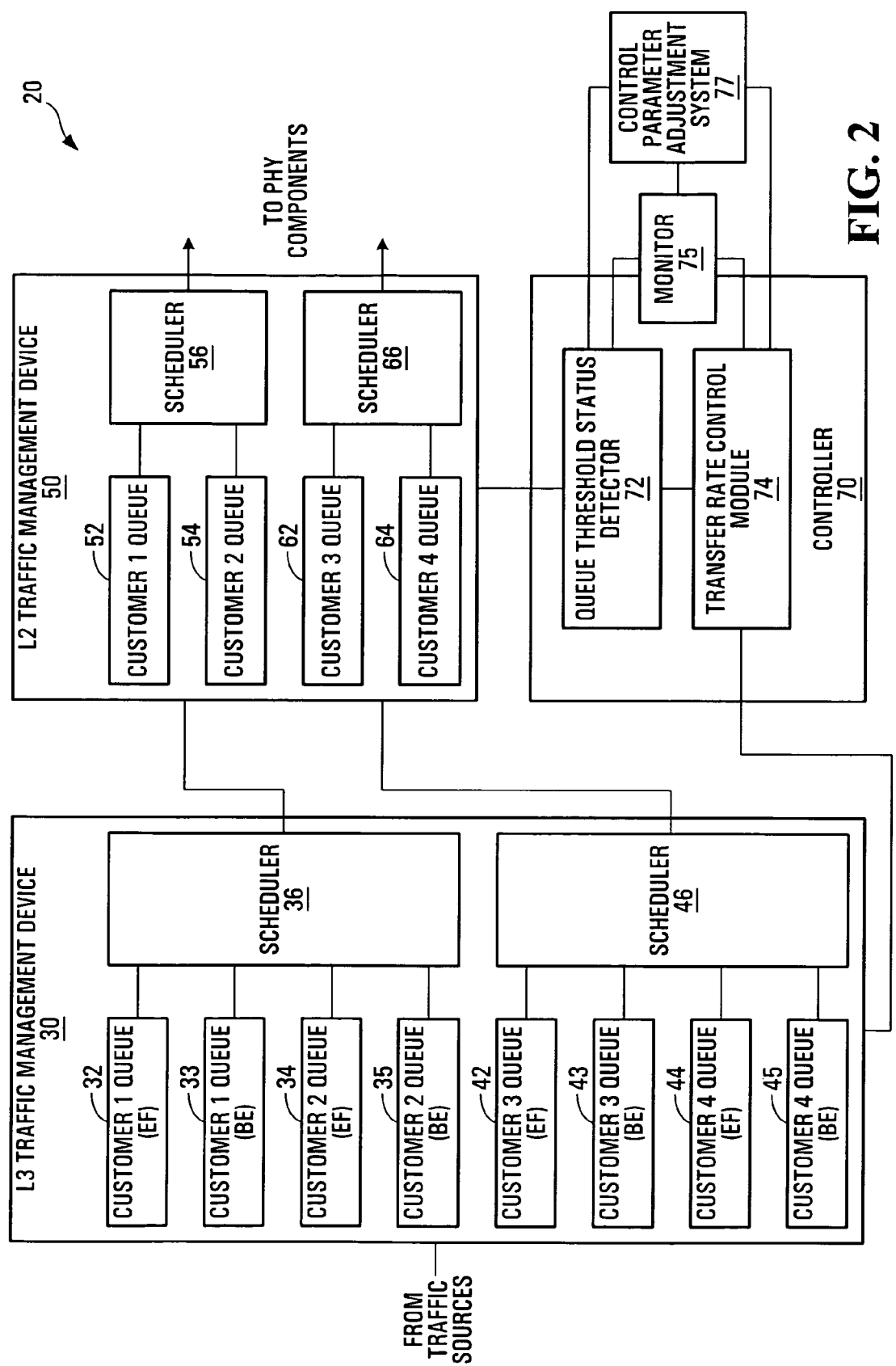
FIG. 2 is a block diagram of an illustrative example communication network element incorporating an embodiment of the invention.

FIG. 2 is a block diagram of an illustrative example communication network element incorporating an embodiment of the invention. The communication network element 20 includes an L3 traffic management (TM) device 30 connected to an L2 TM device 50, a controller 70 which is connected to both TM devices 30, 50, a monitor 75 connected to the controller 70, and a control parameter adjustment system 77 connected to the controller 70 and the monitor 75.

Each of the TM devices 30, 50 includes multiple queues 32-35, 42-45, and 52, 54, 62, 64 and schedulers 36, 46 and 56, 66. The L3 TM device 30 includes two queues per communication traffic source, specifically an Expedited Forwarding (EF) and Best Effort (BE) queue for each of four customers in the example shown in FIG. 2, and one scheduler 36, 46 for each of two physical ports over which communication traffic is sent to the L2 TM device 50. The L2 TM device 50 includes one queue 52, 54, 62, 64 for each Virtual Circuit (VC) through which communication traffic is to be transmitted, with one scheduler 56, 66 for each of two physical ports. The above numbers of queues, VCs, and physical ports are intended solely as illustrative examples. The invention is in no way limited thereto.

In FIG. 2, the controller 70 includes a queue threshold status detector 72 and a communication traffic transfer rate control module 74. The monitor 75 and the control parameter adjustment system 77 have been shown in FIG. 2 as single respective components, but may similarly include multiple functional modules.

Those skilled in the art will appreciate that a network element may include many more components than shown in FIG. 2, which perform other functions than traffic management. For example, pre-TM processing may be performed by L3 and L2 communication devices in which the L3 and L2 TM devices 30, 50 are incorporated. In one embodiment, a network element includes an IP communication device incorporating the L3 TM device 30 and an ATM communication device incorporating the L2 TM device 50. In this case, pre-TM processing by the ATM communication device may include reformatting communication traffic output by the L3 TM device 30 into ATM cells for storage in the queues 52, 54, 62, 64. Since the present invention relates to traffic management monitoring, however, these other components have not been explicitly shown in FIG. 2 to avoid congestion. These and other types of pre-processing and the operation of components by which pre-processing may be performed will be well understood by those skilled in the art.

In a communication equipment rack, the L3 TM device 30 may be implemented in generic hardware installed in multiple slots, and the L2 TM device 50 may be implemented on a line card to be installed in one or more slots, as described briefly above.

According to an embodiment of the invention, the monitor 75 is also implemented on a line card along with the L2 TM device 50 and possibly the controller 70. The control parameter adjustment module 77 may be implemented either locally, at a network element, or remotely, such as at a Network Management System (NMS) of a communication network.

The monitor 75, the operation of which is disclosed in further detail herein, may be implemented in hardware, software for execution by a processor in the L2 TM device 50 or an L2 communication device in which the L2 TM device 50 is implemented, or some combination of hardware and software. A processor which executes monitor software may be a dedicated processor or a general purpose processor which performs further functions in addition to monitoring functions. Other possible implementations of the monitor 75, using Application Specific Integrated Circuits (ASICs), and other types of processor, for example, will also be apparent.

Embodiments in which functions of the monitor 75 are distributed between communication devices which incorporate the TM devices 30, 50 are also contemplated. However, it should be appreciated that no particular division of monitor functions is necessary. In fact, virtually any physical distribution of components implementing embodiments of the invention is possible.

The functions of the controller 70 may similarly be performed by a communication device which incorporates the L3 TM device 30 or the L2 TM device 50, or distributed therebetween. For example, a hardware component implementing the queue threshold status detector 72 may be provided on a line card with the L2 TM device 50, whereas software which implements the transfer rate control module 74 runs on a processor which is on the same card as the L3 TM device 30.

The queue threshold status detector 72 in the controller 70 may be implemented using a Field Programmable Gate Array (FPGA) which collects information to be processed by software as described in further detail below. Implementations of the controller 70 using microprocessors, ASICS, and other types of processor, instead of or in addition to an FPGA, are also contemplated. An FPGA-based queue threshold status detector 72 may have somewhat of a speed advantage over a controller 70 which is substantially or entirely implemented in software, although those skilled in the art will appreciate that software-based embodiments of the controller 70 are certainly possible.

The principal queuing point for egress communication traffic in FIG. 2 is the L3 TM device 30. Here, customer traffic is queued in one of two queues 32/33, 34/35, 42/43, 44/45 per VC, allowing per-class queuing and shaping. These queues are attached to per-physical-port schedulers 36, 46, which service queues in accordance with an L3 TM scheme. For example, the schedulers 36, 46 may service queues which have not exceeded their respective configured transmission rates in a round-robin fashion.

Communication traffic, in the form of packets for instance, is sent from the L3 TM device 30 by the schedulers 36, 46 and received by the L2 TM device 50. Received communication traffic may be reformatted into ATM cells and subject to further pre-TM processing, and is then queued in the per-VC queues 52, 54, 62, 64. Servicing of these queues is determined by ATM class of service and traffic descriptor parameters, as will be well known to those skilled in the art. The per-VC queues 52, 54, 62, 64 fill up as communication traffic rates from the L3 TM device 30 exceeds the output rate from the L2 TM device 50 towards physical layer devices connected to a communication medium.

In the absence of communication traffic transfer rate control, provided by the controller 70 in FIG. 2, the L2 TM device 50 would discard communication traffic once its queues reach configured per-queue and/or total queue depth limits. Co-pending U.S. patent application Ser. No. 11/041,586, entitled "COMMUNICATION TRAFFIC MANAGEMENT SYSTEMS AND METHODS", commonly owned with the present application and filed of even date herewith, discloses communication traffic transfer rate control mechanisms which may be monitored in accordance with embodiments of the invention as disclosed herein. The entire contents of the above co-pending application are incorporated herein by reference. It should be appreciated, however, that although the mechanisms disclosed in the above co-pending application are briefly described and incorporated by reference herein, embodiments of the invention may be implemented to monitor other communication traffic management and transfer rate control mechanisms.

Before proceeding with a detailed description of embodiments of the invention, various aspects of communication traffic management are described below. Traffic management monitoring in accordance with embodiments of the present invention will be more easily understood once illustrative example traffic management and transfer rate control mechanisms have been described.

The queue threshold status detector 72 in the controller 70 is configured to determine the depth of each per-VC queue 52, 54, 62, 64 in the L2 TM device 50 relative to respective queue thresholds. The determination of queue depths may involve, for example, querying the L2 TM device 50. Some commercially available ATM communication devices which incorporate L2 TM devices output on a proprietary bus the depths of the per-VC queues 52, 54, 62, 64. The L2 TM device 50 may output, for each queue, an absolute queue depth or a queue depth which is relative to a configured maximum, for instance. This queue depth output may be provided, for example, each time the L2 TM device 50 receives or transmits communication traffic.

An FPGA which is used to implement the queue threshold status detector 72 may also be programmed with a respective per-VC threshold for each of one or more of the queues 52, 54, 62, 64. Each queue may have a different corresponding threshold, or the same threshold may be used for multiple queues. The FPGA preferably records and maintains the threshold status of each of the per-VC queues and makes the status available to control software. Queue threshold status information may be maintained in any of a variety of formats. For example, the FPGA may maintain a list of only those queues which have crossed their thresholds or update a depth or threshold status indicator for each queue in a list of all per-VC queues.

The transfer rate control module 74 of the controller 70 periodically determines the threshold status of the per-VC queues, by polling the queue threshold status detector 72 for queue threshold status information, for example. If the transfer rate control module 74 determines that a given per-VC queue has exceeded its threshold, then rate control is applied to the L3 TM device 30 to disable the corresponding L3 queue or queues. This control of a rate of transfer of communication traffic from the L3 TM device 30 to the L2 TM device 50 may be effected by generating a single control signal specifying which of the L3 queues are to be disabled or respective control signals for controlling each of the L3 queues. The transfer rate control module 74, when implemented in software for instance, may instead control the L3 queues by writing to registers on the L3 TM device 30. In this case, the transfer rate control module 74 controls the L3 queues without outputting control signals to the L3 TM device 30.

Although a disabled queue may continue to receive and store communication traffic, it no longer sends communication traffic to its scheduler 36, 46. This functionality might instead be supported in the schedulers 36, 46, in which case the schedulers 36, 46 are responsive to rate control from the controller 70 to stop reading communication traffic from the queues 32-35, 42-45 and sending the traffic to the L2 TM device 50. In some embodiments, the output rates of the queues or schedulers are reduced or throttled responsive to rate control applied by the controller 70. This allows for a reduced rate of communication traffic transfer between the TM devices 30, 50 instead of stopping communication traffic flow entirely.

The disabling of queues or throttling of communication traffic output rates allows the per-VC queues in the L2 TM device 50 to drain, and may cause communication traffic buildup in the L3 TM device 30. When the depth of a queue in the L2 TM device 50 returns to below its threshold, any corresponding disabled queues on the L3 TM device 30 are re-enabled. By this means, the output of communication traffic on a given VC is determined by traffic parameters, illustratively ATM traffic parameters, programmed in the L2 TM device 50, whereas the particular mix of communication traffic in an L2 queue, and thus on a VC where the L2 TM device is implemented in an ATM device, is determined by the L3 communication traffic management parameters in the L3 TM device 30. The controller 70 allows the L2 TM device 50 to be used in conjunction with the L3 TM device 30, regardless of whether the L2 TM device 50 uses a backpressure mechanism, or more generally an input communication traffic transfer rate control mechanism, which is not compatible with the communication traffic management policy of the L3 TM device 30.

Operation of the controller 70 as described above also effectively makes the L2 TM device 50 substantially lossless. Traffic loss due to queue buildup will primarily occur at the L3 TM device 30, and not at the L2 TM device 30, thus enabling class-based traffic discards and discard statistics.

Those skilled in the art will appreciate that hardware tends to operate more quickly than software. Thus, software polling for queue threshold status may be relatively slow with respect to the rate of transfer of communication traffic between the L3 and L2 TM devices 30, 50, and accordingly per-VC queue thresholds are preferably kept relatively large. In order to prevent head-of-line block problems, however, where high-priority traffic is scheduled out of the L3 TM device 30, but then sits in a long per-VC queue behind lower-priority traffic in the L2 TM device 50, multiple queues may be provided in the L2 TM device 50 for each VC.

In FIG. 2, for example, incoming IP traffic has two classes or priorities, BE and EF, which are queued separately at the L3 TM device 30. Two queues per VC might then also be provided at the L2 TM device 50, with communication traffic from the L3 TM device 30 being tagged with its priority at the L3 TM device 30 and queued in the correct queue at the L2 TM device 50. The multiple queues for each VC at the L2 TM device 50 may then be controlled in accordance with strict-priority scheduling or another priority-based scheduling scheme.

Variable queue thresholds may be provided for any or all of the per-VC queues at the L2 TM device 50. As described above, the controller 70 monitors depths of queues in the L2 TM device 50 to determine whether corresponding queue thresholds have been crossed. In some situations, it may be desirable to vary the thresholds associated with one or more of the queues of the L2 TM device 50. For example, it is generally preferable to have communication traffic stored in the queues 52, 54, 62, 64, so that the L2 TM device 50 always has communication traffic to transmit. Thus, queue thresholds might be increased if the total of all queue depths is below a threshold, or equivalently if remaining total queue capacity is above a threshold, thereby potentially increasing the rate of communication traffic transfer from the L3 TM device 30 to prevent the L2 TM device 50 from running out of communication traffic. A higher threshold may result in a disabled or restricted L3 queue resuming a normal transfer rate for communication traffic, for example.

Total queue depth or remaining capacity, like individual queue depth, may be determined in any of various ways. Where all per-VC queues obtain memory resources from a common buffer pool, the queue threshold status detector 72 of the controller 70 may query the L2 TM device 50 for buffer depth or remaining capacity, or the L2 TM device 50 may output an indication of buffer depth or remaining capacity. Total queue depth or remaining capacity may instead be calculated by summing all queue depths or remaining capacities. Based on the total depth or remaining capacity, the thresholds of one or more of the per-VC queues may be varied.

Control software which supports the functions of the controller 70 may maintain a table which maps total queue depth or remaining capacity, as a percentage of total queue capacity for example, to a corresponding threshold adjustment factor which is multiplied by a queue's corresponding threshold to calculate an adjusted queue threshold.

Adjusted thresholds are then compared with queue depths to determine whether communication traffic flow from the L3 TM device 30 queues should be stopped or throttled, or alternatively resumed. At higher total queue depths, a threshold adjustment factor of 1 may be used to maintain predetermined queue thresholds, whereas at lower total queue depths, threshold adjustment factors of greater than one may be used to increase thresholds to prevent queue underruns. Alternatively, maximum desired queue thresholds might be set for low total occupancy conditions and adjusted downwards, using adjustment factors of less than 1, when total queue depth or buffer occupancy increases. The total queue depth or remaining capacity levels and multipliers used for queue threshold adjustment are established based on expected or desired communication traffic characteristics or parameters, such as relative incoming and outgoing communication traffic rates, for example.

Variable thresholds may be applied to any or all of the per-VC queues 52, 54, 62, 64 in the L2 TM device 50. According to one possible scheme, variable thresholds are applied on a per physical port basis. In FIG. 2, the thresholds of the queues 52, 54, which queue traffic for one physical port, could be increased or decreased depending on total occupancy levels of those queues.

Another optional feature which may be provided to decrease the likelihood of queues in the L2 TM device 50 draining when corresponding queues in the L3 TM device 30 have been disabled or throttled relates to preferential treatment of backpressured queues. Generally, it is more critical to ensure that L3 queues are turned back on before a corresponding L2 queue drains, than to ensure that the L3 queues are turned off when the corresponding L2 queue exceeds its threshold.

To this end, the controller 70, and preferably the transfer rate control module 74, may maintain a record of any of the queues 52, 54, 62, 64 for which corresponding L3 queues have been disabled or throttled, and perform transfer rate control operations for those queues first. This may be accomplished, for instance, by maintaining a list of L2 queues or VCs for which backpressuring has been applied to corresponding L3 queues, and performing transfer rate control operations first for queues in the list and then for other queues. Two respective lists of L2 queues or VCs for which backpressuring has and has not been applied may also be maintained. A record of backpressuring may instead indicate L3 queues to which backpressuring has and/or has not been applied, with the transfer rate control module 74 then determining corresponding L2 queues which are to be given preference.

Optimizations may also be made to reduce the impact of transfer rate control processing on resources of the TM devices. Thus, the transfer rate control module 74 may keep track of the last state of a given L2 queue, VC, or L3 queue. If the state of a queue or VC has not changed, e.g., if an L2 queue was below its threshold during a previous iteration of transfer rate control operations and is still below the threshold, then the transfer rate control module 74 need not communicate with the L3 TM device 30. In this manner, transfer rate control is further dependent upon a change in state of a queue in addition to its threshold status.

As described above, queues in an upstream TM device may be disabled or throttled responsive to a depth of a corresponding queue in a downstream TM device exceeding a threshold. Multiple threshold implementations are also possible. For example, different levels of throttling may be applied for different queue depths. The transfer rate for an L3 queue might be throttled to different degrees as a corresponding L2 queue reaches successive thresholds, and disabled at some point when the L2 queue reaches a predetermined maximum depth.

Another possible application of multiple thresholds would be to establish two thresholds, a high threshold and a low threshold, per L2 queue. If the depth of a queue is above the high threshold for the queue, then backpressure is applied to reduce a rate of transfer of communication traffic to the queue. The queue is then allowed to drain below its low threshold before the transfer rate is increased or restored. As long as the queue depth remains between the thresholds, the communication transfer rate is preferably not changed. This scheme would work particularly well in a system where, rather than disabling L3 queues, the L3 queues are throttled or turned down and up more gently. If the transfer rate from an L3 TM device is matched with the transmission rate from the L2 TM device, each L2 queue then remains in the preferred queue depth range defined by the high and low thresholds without applying transfer rate control.

Further possible variations of the above operations include selective backpressuring by effectively enabling or disabling the control of the queues or schedulers at the L3 TM device 30 by the controller 70. Backpressuring may be enabled or disabled on a per-physical port or per-VC basis, for example.

Transfer rate control might also or instead be group-specific, such as port-specific or class-specific. For example, virtual buffer pools, including buffers which are dynamically allocated to L2 queues as needed to store incoming communication traffic, may be maintained and used to backpressure L3 queues. For some applications, including per-port communication traffic isolation, it is desirable to limit the number of buffers, out of the total number of available buffers, used by a particular group of communication traffic. This group may be defined based on the port or the class of the traffic, or the combination of port and class of the traffic, for instance.

The number of buffers used in an L2 virtual buffer pool may then be monitored, and when a group has exceeded its allowed buffer usage, backpressure is applied to an upstream L3 traffic management device, as a hardware-based backpressure signal, for example. The L3 traffic management device can then discard traffic according to the L3 traffic management profile for that particular group.

In one implementation, maintenance of virtual buffer pools is handled by the controller 70 in the system 20 of FIG. 2, possibly by an FPGA used to implement the queue threshold status detector. Any of the above techniques for determining queue depth may similarly be used to determine the size of virtual buffer pools. For example, whenever the L2 TM device 50 receives and queues, or dequeues and transmits, traffic associated with a particular group, it may output information to the controller 70 indicating how many buffers are currently used by L2 queues to store traffic for that particular group. The L2 TM device 50 may also inform the controller 70 of the group, a physical port for instance, with which the traffic is associated. Alternatively, the controller 70 may perform calculations based on individual queue depths or other information, to maintain the virtual buffer pools.

The controller 70 thereby maintains counts of the number of buffers used for each group, or more generally the amount of communication traffic stored, for each group. The controller 70, or possibly the queue threshold status detector 72, is also programmed with virtual buffer pool thresholds for each group. When the number of buffers used for a group exceeds the configured threshold, the controller 70 applies transfer rate control, to the L3 TM device 30. This causes one or more queues or schedulers in the L3 TM device 30 to cease transmitting. As the queues in the L3 TM device 30 build up, they may start to discard. However, these discards can now be made based on L3 TM decisions. As described above, discards and discard statistics at an L3 TM device may be class-aware, whereas discards and statistics at an L2 TM device are not class-aware. Normally, an L2 TM device which supports virtual buffer pools would discard communication traffic when the amount of buffers used for a virtual buffer pool is exceeded. Discard mechanisms include Early Packet Discard (EPD)/Partial Packet Discard (PPD) and/or Weighted Random Early Detection (WRED).

Queue- and virtual buffer pool-based transfer rate control may be handled differently by the controller 70. Where the transfer rate control module 74 is implemented in software and applies transfer rate control based on queue depths, such as by writing to registers in the L3 TM device 30 for example, group-specific backpressure may be implemented in hardware, using an FPGA in the detector 72 which also detects queue thresholds for instance. Other specific implementations will be apparent to those skilled in the art.

By keeping track of the number of buffers used per-group, illustratively per-physical-port, port isolation is provided. Traffic from one physical port cannot consume all of the available buffers in the L2 TM device 50. Equivalently, a certain number of buffers can effectively be guaranteed for a physical port.

While the above description refers to maintaining counts of the number of buffers used for a physical port, the generic case applies to keeping track of the number of buffers used in an L2 TM device for one or many sets of virtual buffer pools. These virtual buffer pools may correspond to physical ports, particular classes, or any other grouping. Backpressure can thereby be applied to an L3 TM device for the corresponding group/pool.

Illustrative communication traffic management and transfer rate control mechanisms have been described above. In accordance with embodiments of the present invention, these mechanisms are monitored to ensure that desired effects on communication traffic, to maintain queue depths within predetermined ranges for instance, are actually achieved. If necessary, one or more control parameters used by these mechanisms may also be adapted as described in further detail herein.

In such a complex system as shown in FIG. 2, a monitoring system allows a determination to be made as to whether transfer rate control applied to the L3 queues results in desired behavior at the L2 per-VC queues. Whereas a typical monitoring system may give an external view of the communication traffic being forwarded to one or more VCs or ports, the monitor 75 preferably provides an internal view of the queuing at L2 TM device 50. This in turn provides a more detailed indication of the effects of transfer rate control, such as whether the rate at which backpressure is applied to each L3 queue causes each L2 queue to be treated fairly, any L2 queues or port to be congested, under-running of any L2 queues, or an increase or decrease in head-of-line blocking.

The monitor 75 is thus preferably configured to monitor the effects of communication traffic transfer rate control. In accordance with one embodiment of the invention, the monitor 75 determines the queue depth of one or more queues of the L2 TM device 50 and possibly a control parameter used by the controller 70 in applying transfer rate control to the L3 TM device 30.

As described above, the queue threshold status detector 72 in the controller 70 determines the depth of each per-VC queue 52, 54, 62, 64 in the L2 TM device 50 relative to respective queue thresholds. The monitor 75 may therefore periodically poll the queue threshold status detector 72 for any or all of queue depth, queue threshold, and queue threshold status information. In this case, the monitor 75 may determine the amount of traffic stored in an L2 queue in terms of either the actual depth of the queue or its threshold status, and the queue threshold is illustrative of a control parameter which may be monitored by the monitor 75.

Other information and parameters may be determined by the monitor 75 from the controller 70 or directly from the TM devices 30, 50. In one embodiment, the monitor 75 periodically polls not only the queue threshold status detector 72 for queue thresholds and threshold status information, but also the transfer rate control module 74. The transfer rate control module 74 provides additional information to the monitor 75 to allow a more complete overall current status or "snapshot" of communication traffic transfer rate control to be determined.

The snapshot may include any or all of thresholds for one or more queues, or groups where per-group transfer rate control is supported for each L2 port, traffic class or other type of group, thresholds for each priority queue for one or more VCs where priority queuing is provided at the L2 TM device 50, the threshold status for one or more L2 queues/VCs, the threshold status of one or more groups, the L3 backpressure status of one or more VCs, and the backpressure status of one or more ports on the corresponding L3 bus, for example.

In order to enhance the level of monitoring which is possible, the controller 70 may incorporate additional components such as a counter which counts the number of times that a traffic transfer control cycle has been performed by the transfer rate control module 74. The transfer rate control module 74 may be implemented in software, for example, which periodically polls the queue threshold status detector 72 to determine appropriate transfer rate control to be applied to the L3 TM device 30. The amount of time which has elapsed since completion of the last cycle and the time at which transfer rate control is applied to the L3 TM device 30 may also be useful in monitoring transfer rate control. The controller 70 may thus incorporate a clock or timer from which time-related control parameters may be determined by the monitor 75.

The monitor 75 provides, at an output, an indication of monitored information. In FIG. 2, this output is connected to the control parameter adjustment system 77, which is used to adjust control parameters as described below. In other embodiments, the output of the monitor 75 may be connected to a local or remote data storage device, to thereby store monitored information for later analysis. Monitored information stored in a file in a local memory at a switch, for instance, may be accessed by maintenance personnel through a local user interface or transferred to a remote operator system or NMS.

Various operating characteristics of the monitor 75 may be pre-configured or specified, for example, by an operator. Operating characteristics of the monitor 75 may include a total number of snapshots to be taken, the time interval between snapshots, the specific VCs or ports that are monitored, and whether snapshots are to be taken continuously, to effectively implement a circular buffer where monitored information is stored in memory by the monitor 75, or stopped once a predetermined amount of monitored information has been stored, such as when memory tables have been filled.

The information collected by the monitor 75 may be analyzed to determine whether control parameters should be adapted in order to achieve desired communication traffic control characteristics, such as target L2 queue depths or queue behaviors. Analysis may be performed by an operator of communication equipment, or possibly by components or software configured with communication equipment operating targets.

Based on monitored information and operating targets, a determination may be made as to whether changes should be made to one or more control parameters, such as a rate at which L3 queues are backpressured, to aggressively backpressure the L3 queues rather than just reducing a rate of traffic transfer from the L3 queues for instance, a rate at which the L3 queues are un-backpressured, backpressuring or un-backpressuring thresholds for any or all L2 queues, and/or a polling rate or frequency at which the controller 70 performs a transfer rate control cycle.

For example, with respect to backpressuring and un-backpressuring rates, a closed loop cycle time may be determined. A backpressure cycle time may indicate a time from the detection of an L2 queue exceeding its threshold, to a time at which the corresponding L3 queues are backpressured, and/or a time at which the L2 queue starts to drain. Times of queue depth changes may be tracked by the monitor 75, by tracking times at which it polls the controller 70 or other components for instance, and output along with monitored information.

Un-backpressuring cycle times may also or instead be determined in a substantially similar manner, by tracking the time of detecting that an L2 queue is below its threshold, the time at which the corresponding L3 queues are un-backpressured, and the time the L2 queues begin to fill up once again.

The control parameter adjustment system 77 generally represents an interface, illustratively a Command Line Interface (CLI) at an NMS or a local operator terminal used in debugging or troubleshooting, through which control parameters used by the controller 70 may be adjusted. Adjustments to control parameters may be made by writing to registers used to store queue thresholds or to control transfer of communication traffic out of L3 queues, sending commands to the components 72, 74 of the controller 70, or rebooting communication equipment after downloading new configuration information to an FPGA implementing the queue threshold status detector 72 or new control software to the controller 70. Other possible control parameter adjustment mechanisms will be apparent to those skilled in the art.

In one embodiment, the monitor 75, the control parameter adjustment system 77, or another intermediate processing system makes determinations as to whether control parameters are to be adjusted, and applies adjustments to the control parameters. Other embodiments involve analysis of monitored information by an operator or other personnel to determine whether control parameter changes should be made. The operator then adjusts control parameters using the control parameter adjustment system 77.

Further processing of monitored information, such as to generate graphs or other representations, may be performed to facilitate analysis of the monitored information, whether control parameter adjustments are made automatically by the system 77 or manually using the system 77.

Variations of the monitor 75 and monitoring operations in accordance with particular transfer rate control mechanisms will be apparent from the foregoing. In conjunction with priority queuing at the L2 TM device 50, for example, the monitor 75 may monitor high and low priority queues for each VC, which provides for determination of the priority of traffic being forwarded from the L3 TM device 30 to the L2 TM device 50, and whether the queues of the appropriate priority on the L3 TM device 30 need to be backpressured more or less aggressively.

Port level buffers may also be monitored using virtual buffer pools for instance. This allows monitoring of whether L3 queues destined for a port are backpressuring or un-backpressuring appropriately. Behaviors associated with other groups, based on traffic class or a combination of port and class, for example, may also be monitored.

As described above, the controller 70 may adjust queue thresholds according to a multiplier. A series of multipliers, with associated total queue depths or buffer occupancy levels at which the multipliers are to be used, may be specified in a threshold multiplier table. The threshold multiplier table may be adjusted or replaced to thereby adapt a transfer rate control mechanism.

Figure 3:
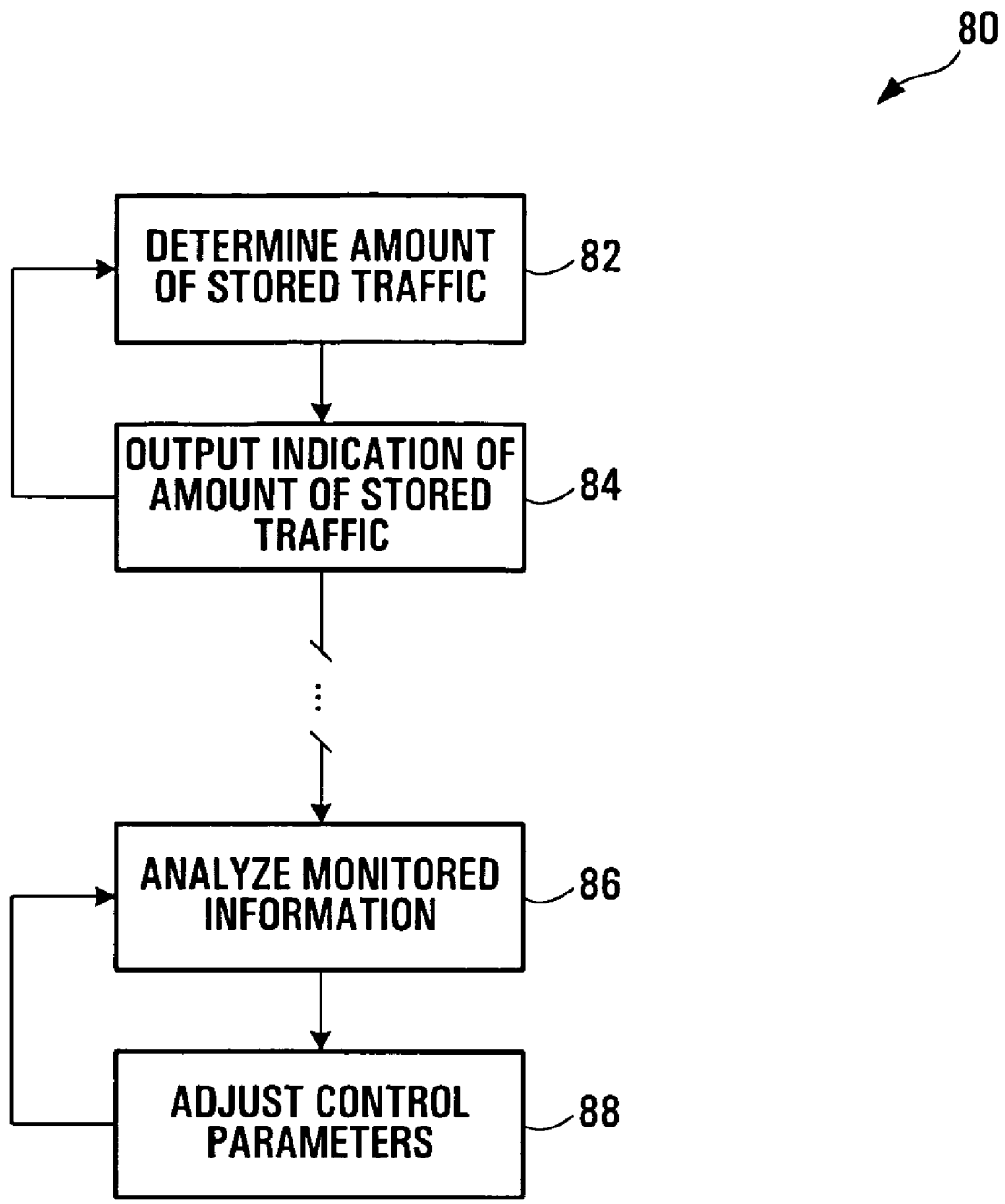
FIG. 3 is a flow diagram of a method according to an embodiment of the invention.

Various embodiments of the invention providing systems for monitoring the transfer of communication traffic between communication traffic management devices have been described in detail above. The present invention also provides monitoring methods. FIG. 3 is a flow diagram of a method according to a further embodiment of the invention.

The method 80 of FIG. 3 begins with an operation 82 of determining an amount of communication traffic stored in at least one communication traffic queue of at least one of the communication traffic management devices between which communication traffic is transferred. The amount of stored communication traffic is determined at multiple times, so as to compile a history of effects of traffic transfer rate control on queue occupancy, in the L2 TM device 50 and/or the L3 TM device 30 of FIG. 2, for example. In one embodiment, the operation at 82 is performed during multiple transfer rate control cycles. A transfer rate control cycle may include one or more transfer rate control operations, such as determining queue depths and applying transfer rate control based on the determined queue depths.

An indication of the amount of communication traffic determined at 82 is provided at 84. As described above, monitored information, in this case an indication of the amount of stored communication traffic as determined at 82, may be stored in a memory. The indication provided at 84 may thus be a queue depth or a threshold status which is output to a memory for storage. An indication may be provided at 84 each time an amount of stored communication traffic is determined at 82, as shown. In some embodiments, amounts of communication traffic stored in multiple communication traffic queues are determined substantially simultaneously, by polling a controller or a communication traffic management device for instance, and an indication thereof is provided at 84.

Monitored information may subsequently be analyzed at 86. The broken line in FIG. 3 clearly indicates that this analysis may be undertaken at some time after monitored information has been collected at 82 and output, illustratively for storage in a memory, at 84. Several examples of possible analysis operations which may be performed at 86 have been described above.

Based on the analysis at 86, a determination may be made as to whether one or more control parameters of the transfer rate control mechanism should be adjusted in order to achieve target communication traffic behavior. If so, then the control parameter(s) may be adjusted accordingly at 88.

It should be appreciated that the method 80 as shown in FIG. 3 is representative of one embodiment of the invention, and that methods according to other embodiments may involve fewer or further operations which may be performed in a different order than explicitly shown.

For example, although the operations at 82/84 and 86/88 are shown in FIG. 3 as sequential operations, a monitor may continue to perform the operations at 82 and 84 while the determination and adjustment operations at 86 and 88 are being performed.

Methods according to embodiments of the invention may also include additional operations and features, in conjunction with transfer rate control features such as variable queue thresholds, preferential treatment of backpressured queues, state change-based control, multiple thresholds, and priority queuing, which have been described in detail above.

Other variations of the example method 80 will also be apparent to those skilled in the art, from the foregoing description for instance. Control parameters, for example, may also be determined at 82 and analyzed at 86 when determining whether adjustments to control parameters should be made.

Embodiments of the present invention as disclosed herein thus provide for monitoring of a communication transfer rate control mechanism. The transfer of communication traffic allows sophisticated L3 communication traffic management, together with, for example, ATM TM 4.1-compliant communication traffic shaping, using available devices rather than specialized hardware. The transfer rate control mechanism applies transfer rate control based on current conditions. However, according to embodiments of the invention, both current and past conditions are monitored. In some embodiments, a communication traffic storage history is monitored so as to determine whether the transfer rate control mechanism, over a period of time which preferably includes multiple transfer rate control cycles, actually accomplishes intended transfer rate patterns or behaviors.

What has been described is merely illustrative of the application of principles of the invention. Other arrangements and methods can be implemented by those skilled in the art without departing from the scope of the present invention.

For example, references to thresholds being exceeded or crossed should not be interpreted as indicating strictly "greater than" threshold determinations. A threshold may be considered to be exceeded when an associated parameter, queue depth or buffer occupancy for instance, either reaches or exceeds the threshold. Thus, a parameter which is equal to its threshold may or may not be considered as having exceeded the threshold, depending on design preferences.

It should also be appreciated that implementation of a communication device incorporating an embodiment of the present invention in communication equipment does not necessarily preclude the implementation of other types of communication device in the same communication equipment. For example, as described above, substantially the same hardware may be provided in multiple slots in a communication equipment rack. It is contemplated that line cards installed in some slots could incorporate embodiments of the invention, whereas line cards installed in other slots might not.

Embodiments of the present invention may also possibly be applied to other than IP and ATM, or Layer 3 and Layer 2, traffic management devices. The above references to IP/ATM and Layer 3/Layer 2 are intended solely for illustrative purposes.

Particular implementation details may differ from the example embodiments shown in the drawings and described above. FIG. 2, for instance, shows the monitor 75 as being connected to components of the controller 70. However, information may also or instead be collected directly from the TM devices 30, 50 or other components.

In addition, although described primarily in the context of methods and systems, other implementations of the invention are also contemplated, as instructions stored on a machine-readable medium, for example.

Embodiments of the invention may also be implemented in situations in which a traffic management device receives communication traffic from more than one other traffic management device. The feedback mechanisms disclosed herein could be applied to monitor transfer rate control applied between any or all of the other traffic management devices from which communication traffic is received.

It is also contemplated that embodiments of the invention disclosed herein may be extended to systems with three or more traffic management devices. A firewall-type communication device, for instance, might perform per-application/per-class/per-VC traffic management by using three traffic management devices and implementing one or more software feedback loops between them. The effects of any or each of the software loops may be monitored as disclosed herein.

Another possible implementation of embodiments of the invention would be in conjunction with a single device in which diverse traffic management schemes are applied to communication traffic. In this case, monitoring may be implemented for transfer rate control which is applied to control a first traffic management scheme and thereby a rate of transfer of communication traffic for processing in accordance with a second traffic management scheme. Thus, although embodiments of the invention described above are implemented with two separate traffic management devices, the techniques disclosed herein are not limited to situations in which traffic management functions have been divided between separate physical devices in any particular manner. Embodiments of the invention may be used to monitor inter-operation of different traffic management schemes which may or may not necessarily be implemented in separate traffic management devices. References herein to traffic management devices should therefore be interpreted accordingly, as encompassing implementations of diverse traffic management schemes in distinct physical devices or possibly a single device.

References to periodically performing operations should also be interpreted in a non-limiting manner. Periodic operations may, but need not necessarily, be performed at regular, fixed time intervals.

We claim:

1. A system for monitoring a communication traffic transfer rate control mechanism in accordance with which transfer rate control is applied to a first communication traffic management device to control a rate of transfer of communication traffic from the first communication traffic management device to a second communication traffic management device, the system comprising:
   a monitor configured to compile a communication traffic storage history by determining respective amounts of communication traffic stored in at least one communication traffic queue of at least the second communication traffic management device at each of a plurality of monitor times, and to determine, based on the communication traffic storage history, whether the transfer rate control mechanism achieves target communication traffic behavior at the second communication traffic management device;
   an output configured to provide an indication of the determined amounts of communication traffic; and
   a control parameter adjustment system, coupled to the monitor, to adjust a control parameter of the transfer rate control mechanism responsive to a determination by the monitor that the transfer rate control mechanism does not achieve the target communication traffic behavior at the second communication traffic management device,
   wherein the control parameter adjusted by the control parameter adjustment system responsive to the determination comprises at least one of: a threshold based upon which the transfer rate control mechanism controls the rate of transfer of communication traffic between the communication traffic management devices, a threshold multiplier used to adjust a threshold based upon which the transfer rate control mechanism controls the rate of transfer of communication traffic between the communication traffic management devices, a degree to which the transfer rate control mechanism reduces or increases the rate of transfer of communication traffic between the communication traffic management devices, and a frequency at which the transfer rate control mechanism performs a transfer rate control operation to determine whether transfer rate control is to be applied to the first communication traffic management device.

2. The system of claim 1, wherein:
   the transfer rate control mechanism periodically performs transfer rate control operations; and
   the plurality of monitor times span a plurality of transfer rate control operations.

3. The system of claim 1, wherein the first and second communication traffic management devices employ respective communication traffic management schemes, the first communication traffic management device being capable of transferring communication traffic, in accordance with a first communication traffic management scheme, to the second communication traffic management device for processing in accordance with a second communication traffic management scheme.

4. The system of claim 3, wherein the first communication traffic management device comprises an Internet Protocol (IP) communication traffic management device, and wherein the second communication traffic management device comprises an Asynchronous Transfer Mode (ATM) communication traffic management device.

5. The system of claim 1, wherein:
   the monitor is further configured to determine a control parameter of the transfer rate control mechanism at each of the plurality of monitor times; and
   the output is further configured to provide an indication of the control parameter determined by the monitor.

6. The system of claim 5, wherein the control parameter determined by the monitor comprises at least one of: a threshold based upon which the transfer rate control mechanism controls the rate of transfer of communication traffic between the communication traffic management devices, a type of transfer rate control which is currently applied by the transfer rate control mechanism, a component of the first communication traffic management device to which transfer rate control is currently applied by the transfer rate control mechanism, a component of the second communication traffic management device for which transfer rate control is currently applied by the transfer rate control mechanism, communication traffic to which transfer rate control is currently applied by the transfer rate control mechanism, a number of times that a traffic transfer control operation has been performed by the transfer rate control mechanism, a time at which transfer rate control was applied, and an amount of time which has elapsed since completion of a preceding traffic transfer control operation.

7. The system of claim 6, wherein the threshold comprises at least one of: a threshold associated with a communication traffic queue, and a threshold associated with a plurality of communication traffic queues.

8. The system of claim 1, wherein the monitor is configured to determine the amounts of communication traffic as a depth of the at least one communication traffic queue or a threshold status of the at least one queue, the threshold status of a queue indicating whether the amount of traffic stored in the queue exceeds a threshold associated with the queue.

9. The system of claim 1, wherein: the transfer rate control mechanism is implemented using a queue threshold status detector which is configured to determine whether an amount of communication traffic currently stored in a communication traffic queue of the second communication traffic management device exceeds a threshold, and a transfer rate control module operatively coupled to the queue threshold status detector and configured to apply transfer rate control to the first communication traffic management device, based on whether the amount of communication traffic exceeds the threshold; and the monitor is operatively coupled to and configured to poll the queue threshold status detector at each of the plurality of monitor times to thereby determine the respective amounts of communication traffic stored in the at least one queue as a threshold status of the at least one queue.

10. The system of claim 1, wherein the monitor is implemented in software for execution by a processor.

11. A method of monitoring a communication traffic transfer rate control mechanism in accordance with which transfer rate control is applied to a first communication traffic management device to control a rate of transfer of communication traffic from the first communication traffic management device to a second communication traffic management device, the method comprising:
   determining respective amounts of communication traffic stored in at least one communication traffic queue of at least the second communication traffic management device at each of a plurality of monitor times to thereby compile a communication traffic storage history;
   providing an indication of the determined amounts of communication traffic;
   determining, based on the communication traffic storage history, whether the transfer rate control mechanism achieves target communication traffic behavior at the second communication traffic management device; and
   adjusting a control parameter of the transfer rate control mechanism where the transfer rate control mechanism does not achieve the target communication traffic behavior at the second communication traffic management device,
   wherein adjusting comprises adjusting at least one of: a threshold based upon which the transfer rate control mechanism controls the rate of transfer of communication traffic between the communication traffic management devices, a threshold multiplier used to adjust a threshold based upon which the transfer rate control mechanism controls the rate of transfer of communication traffic between the communication traffic management devices, a degree to which the transfer rate control mechanism reduces or increases the rate of transfer of communication traffic between the communication traffic management devices, and a frequency at which the transfer rate control mechanism performs a transfer rate control operation to determine whether transfer rate control is to be applied to the first communication traffic management device.

12. The method of claim 11, wherein:
   the transfer rate control mechanism periodically performs transfer rate control operations; and
   the plurality of monitor times span a plurality of transfer rate control operations.

13. The method of claim 11, further comprising:
   determining a control parameter of the transfer rate control mechanism at each of the plurality of monitor times; and
   providing an indication of the determined control parameter.

14. The method of claim 13, wherein determining a control parameter comprises determining at least one of: a threshold based upon which the transfer rate control mechanism controls a rate of transfer of communication traffic between the communication traffic management devices, a type of transfer rate control which is currently applied by the transfer rate control mechanism, a component of the first communication traffic management device to which transfer rate control is currently applied by the transfer rate control mechanism, a component of the second communication traffic management device for which transfer rate control is currently applied by the transfer rate control mechanism, communication traffic to which transfer rate control is currently applied by the transfer rate control mechanism, a number of times that a traffic transfer control operation has been performed by the transfer rate control mechanism, a time at which transfer rate control was applied, and an amount of time which has elapsed since completion of a preceding traffic transfer control operation.

15. The method of claim 11, wherein determining respective amounts of communication traffic comprises determining the amounts of communication traffic as a depth of the at least one communication traffic queue or a threshold status of the at least one queue, the threshold status of a queue indicating whether the amount of traffic stored in the queue exceeds a threshold associated with the queue.

16. A machine-readable medium storing instructions which when executed perform the method of claim 11.

* * * * *